(12) United States Patent
Davis

(10) Patent No.: US 11,348,152 B1
(45) Date of Patent: May 31, 2022

(54) SYSTEMS AND METHODS FOR CREATING APPAREL THAT PROVIDES EMBEDDED VERIFICATION OF A TRANSFERRABLE NON-FUNGIBLE TOKEN

(71) Applicant: Offstage Holdings, Inc., Irvine, CA (US)

(72) Inventor: Danny Davis, Rancho Santa Margarita, CA (US)

(73) Assignee: Offstage Holdings, Inc., Irvine, CA (US)

( * ) Notice: Subject to any disclaimer, the term of this patent is extended or adjusted under 35 U.S.C. 154(b) by 0 days.

(21) Appl. No.: 17/586,599

(22) Filed: Jan. 27, 2022

(51) Int. Cl.
*G06Q 30/06* (2012.01)
*G06Q 20/12* (2012.01)
*G06Q 30/00* (2012.01)

(52) U.S. Cl.
CPC ....... *G06Q 30/0609* (2013.01); *G06Q 20/123* (2013.01); *G06Q 20/1235* (2013.01); *G06Q 30/018* (2013.01); *G06Q 30/0185* (2013.01); *G06Q 30/0601* (2013.01); *G06Q 30/0621* (2013.01)

(58) Field of Classification Search
CPC .......... G06Q 30/0609; G06Q 30/0601; G06Q 30/0621; G06Q 30/018; G06Q 30/0185; G06Q 20/123; G06Q 20/1235
USPC .................................................... 705/26.35
See application file for complete search history.

(56) References Cited

U.S. PATENT DOCUMENTS

| 2015/0269699 | A1* | 9/2015 | Burgess | G06Q 50/14 |
| | | | | 705/325 |
| 2021/0398095 | A1* | 12/2021 | Mallett | G06Q 20/1235 |
| 2022/0058632 | A1* | 2/2022 | Yantis | G06Q 20/1235 |

FOREIGN PATENT DOCUMENTS

WO    WO-2021140460 A1 *  7/2021   ............. G06Q 20/02

OTHER PUBLICATIONS

Article, " Mallett jeffery R and ferri Christian apply for patent on apparatus and method for managing branded digital items" published Dec. 25, 2021; Global IP News.Optics & Imaging Patent News Retrieved from Dialog on Apr. 15, 2022.*

* cited by examiner

*Primary Examiner* — Yogesh C Garg
(74) *Attorney, Agent, or Firm* — Ansari Katiraei LLP; Arman Katiraei; Sadiq Ansari

(57) ABSTRACT

Disclosed are systems and methods to create apparel and other goods that provide embedded verification of a transferrable non-fungible token ("NFT"). For instance, a system may identify a good with a visualization of an NFT artifact, and a tag that is encoded with a unique network identifier. The system may obtain data for a profile of a user that purchases the good, may link the data from the profile of the user to the unique network identifier, may record the user as an owner of a NFT created for the NFT artifact on a blockchain, and may link the NFT to the unique network identifier. The system may present a website that is dynamically populated with the data from the profile and ownership information recorded with the NFT on the blockchain in response to a request from a device that reads the unique network identifier from the tag.

19 Claims, 7 Drawing Sheets

US 11,348,152 B1

SYSTEMS AND METHODS FOR CREATING APPAREL THAT PROVIDES EMBEDDED VERIFICATION OF A TRANSFERRABLE NON-FUNGIBLE TOKEN

BACKGROUND

A non-fungible token ("NFT") is an immutable unit of data that is stored on a blockchain. NFTs may be associated with various assets including works of art created on a digital medium, and each NFT may be used to verify an original or specific instance of a work and/or the owner of that work. However, NFTs are not directly linked to a physical asset and/or a digital asset. The asset itself may be transferred or reproduced without any impact to the NFT. Accordingly, the value of owning an asset may be entirely disassociated from the value of owning the NFT that verifies ownership of the asset.

DETAILED DESCRIPTION OF PREFERRED EMBODIMENTS

Figure 1:
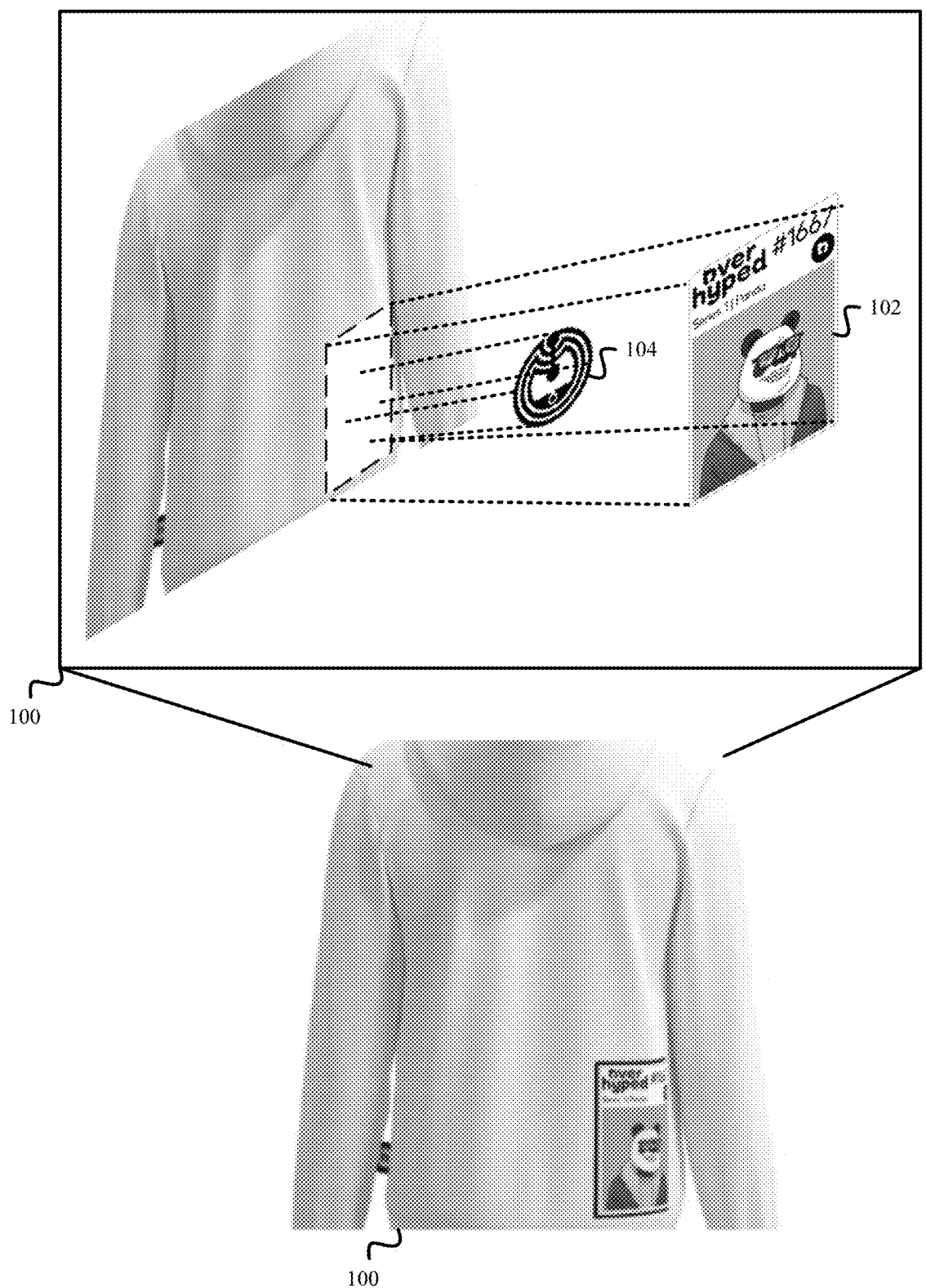
FIG. 1 illustrates an example of a clothing item that provides embedded verification of a non-fungible token ("NFT") in accordance with some embodiments presented herein.

The following detailed description refers to the accompanying drawings. The same reference numbers in different drawings may identify the same or similar elements.

Provided are systems and methods for creating apparel, wearable accessories, and/or other physical goods that provide embedded verification of a non-fungible token ("NFT"). The systems and methods may include creating a physical good that provides a visualization or presentation of artwork, an artifact, or another asset on the physical good, embedding a Near Field Communication ("NFC") tag, Radio-Frequency Identification ("RFID") tag, integrated circuit, or other tag into the physical good, and linking the tag to a NFT that tracks ownership of the artwork, artifact, or the asset on the blockchain.

The NFT may confer a first value to the NFT owner, and the physical good that presents the NFT artwork, artifact, or asset may confer a separate second value to the individual in possession of the physical good. The systems and methods may provide additional value by verifying combined ownership and/or possession of that good and the NFT for the particular artwork presented on that good.

In some embodiments, the systems and methods may provide a third value from a two-prong verification that is satisfied when the owner of a physical good is also the owner of the NFT for the artwork, artifact, or asset displayed on that physical good via the tag that is embedded in the physical good. For instance, the systems and methods may grant and/or provide an individual access to events, locations, and/or other secured physical or digital experiences upon verifying that the individual possesses a good with an embedded tag that is linked to a particular NFT, and the particular NFT identifying that individual as the NFT owner. Conversely, the systems and methods may deny entry or access in response to an individual that demonstrates ownership of a particular NFT without also demonstrating ownership of a good with an embedded tag linked to that NFT, or may deny entry or access in response to an individual that demonstrates ownership of the good with an embedded tag that is linked to a particular NFT without being recorded as the owner of the particular NFT on the blockchain. In this manner, the embedded tag may directly link the first value associated with ownership of the NFT to the second value associated with the physical good (e.g., hat, shirt, sweatshirt, jacket, shoes, purse, etc.) in order to create the third value.

The systems and methods may provide for the transfer of NFT ownership from one good to another or from one owner to another without having to alter the tags within each good. Consequently, a particular NFT and the good linked to the particular NFT may be sold and/or transferred together or separate from one another.

In some embodiments, the embedded tag may be used to verify the authenticity of the associated good. For instance, the embedded tag may verify purchase history of the good from an authorized retailer, the manufacturing date and/or location of the good, and/or other information to prove that the good originated from a particular merchant, brand, or seller.

FIG. 1 illustrates an example of clothing item 100 that provides embedded verification of a NFT in accordance with some embodiments presented herein. As shown in FIG. 1, clothing item 100 may be a sweatshirt that presents visualization of artifact 102 on one or more surfaces, and that is embedded with tag 104.

In some embodiments, artifact 102 may be sewn (e.g., as a patch), printed, bonded, adhered, and/or otherwise affixed to clothing item 100 using different manufacturing processes. For instance, screen printing, direct-to-garment ("DTG") printing, heat transfer printing, dye-sublimation printing, plastisol transfer printing, and/or other techniques may be used to affix and present artifact 102 on one or more surfaces of clothing item 100. In some embodiments, the pattern of the fabric or material used for the outer layer of clothing item 100 may be in the form of artifact 102.

Artifact 102 may include an image, formatted and/or stylized text, video, audio, artwork, and/or other expression. Artifact 102 may exist separately in digital form as a file. A NFT may be minted and/or created to track ownership of artifact 102 on the Ethereum blockchain or other blockchain. For instance, the NFT may include a token or smart contract that is generated from a unique hash of a digital file storing a specific instance (e.g., an original instance, a specific number within a limited series or collection, a first edition, etc.) of artifact 102, and ownership history of that specific instance may be recorded to the token or smart contract.

Tag 104 may be embedded into the fabric of clothing item 100 and/or directly under or adjacent to artifact 102. Tag 104 may include an NFC, RFID, integrated circuit, and/or other machine-readable chip or circuit that stores and/or is encoded with a value. The value may include a Uniform Resource Locator ("URL"), network identifier, and/or other data that cannot be changed once written to tag 104. Specifically, tag 104 may store a value that links to the NFT for artifact 102.

In some embodiments, clothing item 100 may include other apparel and accessories such as pants, shirts, jackets, scarves, hats, shoes, belts, purses, and/or bags. In some embodiments, other goods adorned with artifact 102 and embedded with tag 104 may be associated with the described systems and methods. For instance, artifact 102 may be printed on the casing of a smartphone case, and an NFC chip within the smartphone may be used as tag 104.

Figure 2:
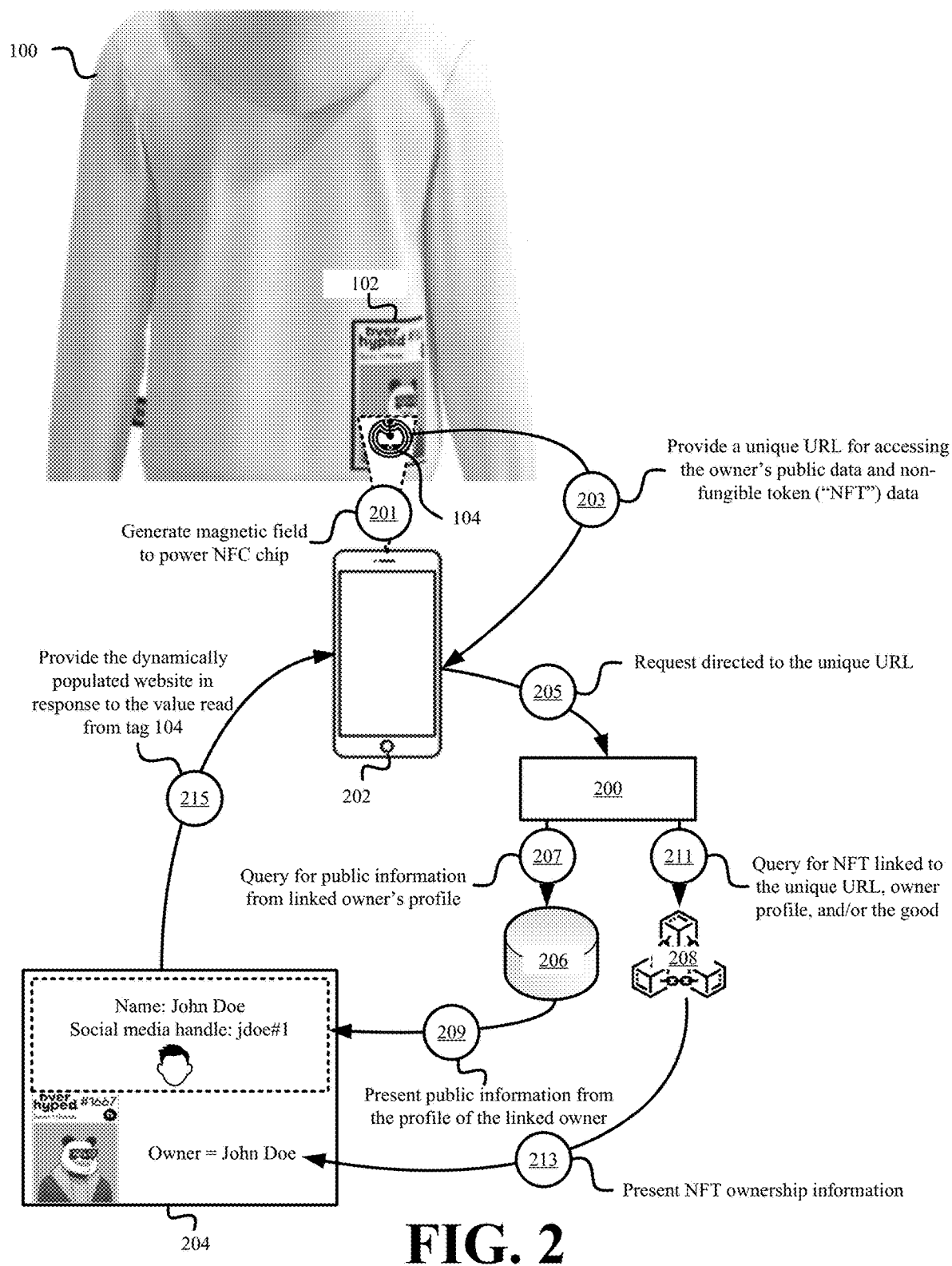
FIG. 2 illustrates an example of NFT-linked-goods system that directly links an embedded tag to a NFT in accordance with some embodiments presented herein.

FIG. 2 illustrates an example of NFT-linked-goods system 200 directly linking embedded tag 104 to a NFT in accordance with some embodiments presented herein. As shown in FIG. 2, a reader, scanner, and/or other device 202 that may read and/or scan tag 104 may be positioned near tag 104. For instance, tag 104 may be embedded under the presentation of artifact 102 on clothing item 100, and device 202 may be positioned next to the presentation of artifact 102 in order to read the value encoded within tag 104.

Device 202 may generate (at 201) a magnetic field that supplies power to tag 104. Upon receiving power, tag 104 may wirelessly transmit (at 203) the stored value to device 202. The stored value may correspond to a URL, network address, and/or identifier for accessing website 204 that is populated with information made public by the owner of clothing item 100 and the latest NFT ownership information.

In some embodiments, each tag 104 in each clothing item 100 is encoded with a unique or different URL. For instance, a first tag embedded in a first clothing item may be encoded with the first URL "overhyped.io/public/site1", and the second tag embedded in a second clothing item may be encoded with the second URL "overhyped.io/public/site2". When a user purchases clothing item 100 from NFT-linked-goods system 200, system 200 may require the user to create and/or populate a user profile with public and/or private information, and may associate the unique URL from tag 104 of purchased clothing item 100 to that profile so that whenever the unique URL is accessed, a website that is dynamically populated with the public information from the user profile is provided to the requesting device. Additionally, NFT-linked-goods system 200 may link the NFT associated with the purchased clothing item 100 to the profile or the unique URL so that whenever the unique URL is accessed, the latest NFT data may be retrieved from the blockchain and presented on the website.

As shown in FIG. 2, device 202 may issue (at 205) a request for website 204 using the stored value that is read from tag 104. The request may include a HyperText Transfer Protocol ("HTTP") Get request that is directed to the unique URL encoded as the value stored within tag 104.

In response to receiving (at 205) the request for website 204, NFT-linked-goods system 200 may determine that the unique URL is associated with a particular user profile, and may query (at 207) database 206 and/or another repository for the public information contained within the particular user profile. NFT-linked-goods system 200 may populate (at 209) website 204 with the public information from the particular user profile that is retrieved from database 206. For instance, the published public information on website 204 may include one or more of the name, social media contact information, image, avatar, links to other websites of the owner, and/or other information that the owner has make publicly accessible.

NFT-linked-goods system 200 may also obtain the NFT that is linked to clothing item 100, the particular user profile, and/or the value encoded within tag 104 from database 206. NFT-linked-goods system 200 may query (at 211) blockchain 208 using the NFT in order to retrieve the latest data entered into blockchain 208 for the NFT. The NFT data may track the ownership history of the NFT and/or for artifact 102 presented on clothing item 100. NFT-linked-goods system 200 may populate (at 213) website 204 with the NFT ownership information and/or a status indicating whether the individual identified in particular user profile is the current owner of the NFT.

NFT-linked-goods system 200 may provide (at 215) device 202 with dynamically populated website 204. Dynamically populated website 204 may present the clothing item 100 owner public profile information and the latest ownership information for the NFT of artifact 102. Accordingly, the unique URL, network identifier, or other value stored to embedded tag 104 may be statically linked to the same publicly accessible website (e.g., website 204) associated with clothing item 100. However, by dynamically populating the publicly accessible website with data from the particular user profile and the blockchain, the contents of the publicly accessible website may change when accessed at different times depending on whether the data associated with the particular profile and/or the NFT changes between each request.

Figure 3:
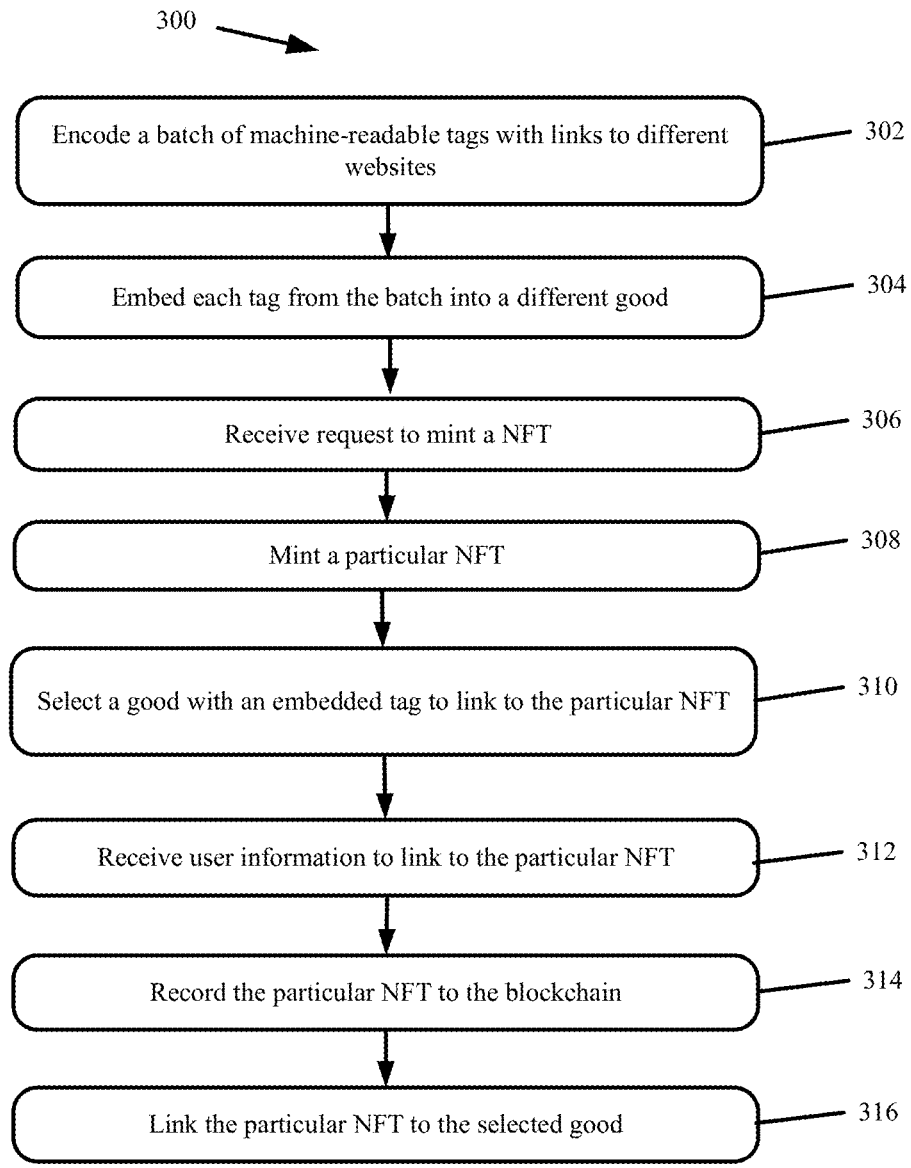
FIG. 3 present a process for creating apparel that provides embedded verification of a NFT in accordance with some embodiments presented herein.

FIG. 3 present a process 300 for creating apparel that provides embedded verification of a NFT in accordance with some embodiments presented herein. Process 300 may be performed by NFT-linked-goods system 200 or another system that includes encoding, manufacturing, printing, NFT minting, and/or other devices or equipment.

Process 300 may include encoding (at 302) a batch of NFC, RFID, and/or other tags (e.g., two or more tags) with immutable links (e.g., URLs) to different websites. For instance, a first tag in the batch may be encoded with a first URL pointing to the address "overhyped.io/public/site1", and a second tag in the batch match encoded with a second URL pointing to the different address "overhyped.io/public/site2". An encoder of NFT-linked-goods system 200 may track all URLs that have been previously encoded into older tags, and the encoder may iterate or change the link that is encoded to each new tag so that the link encoded to each tag is unique. The links may be immutable by virtue of the tags being locked after encoding with an initial value. In other words, once the tags store a value, that tag and/or value cannot be changed.

Process 300 may include embedding (at 304) each tag from the batch into a different good. The good may include apparel (e.g., clothing items), wearable accessories (e.g., purses, bags, etc.), and/or other physical products. Embedding (at 304) may include sewing, stitching, adhering, layering, and/or otherwise securely affixing the tag to the good. In some embodiments, embedding (at 304) may include hiding the tag under an outer layer of the good or under a surface where an NFT artifact may be displayed. For instance, manufacturing equipment controlled by NFT-linked-goods system 200 may place a tag in the front center, front bottom right corner, and/or other designated position about the good, and a layer of fabric, an adhesive, stitching, and/or other manufacturing techniques may be used to secure and/or hide the tag at the designated position of the good. In some other embodiments, the tag may be exposed on the good near or adjacent to where the NFT artifact may be displayed.

Process 300 may include receiving (at 306) a request to mint a NFT. For instance, a user may access a NFT minting node of NFT-linked-goods system 200 and/or a website or interface provided by the NFT minting node in order to select and/or purchase an NFT artifact, a NFT that authenticates ownership of a NFT artifact, and/or a physical good (e.g., apparel) that presents and/or is linked to a NFT artifact.

In some embodiments, the NFT artifact may include an image, design, pattern, artwork, formatted and/or stylized text, video, audio, and/or other expression. In some embodiments, the NFT artifact may include one of several variations of a common design or a variation from a design collection.

The NFT minting node may present different NFT artifacts or NFT collections that are available for minting and/or purchase via a website or application. In some embodiments, the user may select which NFT artifact the user wishes to purchase. In some embodiments, the user may select a collection, and the NFT minting node may create or assign a unique NFT artifact from the collection to the user without the user having selected the unique NFT artifact. Additionally, the NFT minting node may present different physical goods that may be linked to the NFT. For instance, the user may select a particular NFT or NFT artifact, and a specific item of clothing to be linked to the particular NFT or NFT artifact. The request to mint the NFT may include payment for purchasing the NFT artifact, NFT, or good that is linked to the NFT.

Process 300 may include minting (at 308) a particular NFT for the user in response to the request. Minting (at 308) the particular NFT may include generating, allocating, and/or reserving the particular NFT for the user. For instance, NFT minting node may generate a unique artifact in digital form (e.g., a unique image stored as a .png file), hash the contents of the unique artifact, and create the NFT based on the hash result.

Process 300 may include selecting (at 310) a good with an embedded tag to link to the particular NFT. The user may have specified the type of good (e.g., white hooded sweatshirt) to link to the particular NFT in the NFT mint request. In some embodiments, selecting (at 310) the good may include selecting a good that has an embedded tag and a surface onto which the artifact associated with the particular NFT may be transferred, printed, and/or otherwise affixed. In some such embodiments, a printing device or other manufacturing equipment under control of NFT-linked-goods system 200 may be used to transfer, print, and/or otherwise affix the artifact associated with the particular NFT onto the selected good. In some other embodiments, selecting (at 310) the good may include inspecting the available inventory to select and/or retrieve the good that has an embedded tag and that also has the artifact for the particular NFT already displayed on the good. For instance, each of the goods with an embedded may have a different NFT artifact printed on the good such that selecting (at 310) the good includes identifying the good within inventory that has a desired NFT artifact printed on it.

Process 300 may include receiving (at 312) user information to link to the particular NFT. For instance, the user may create or login to a profile that is populated with identifying information provided by the user and/or information that the user provides for association with the particular NFT. The user may populate the profile with a name, street address, email address, social media links, URLs for user-operated websites, images, and/or information that verify the identity of the user and/or that may be used to verify ownership of the particular NFT.

In some embodiments, the user may have the option of making some of the information within the profile publicly accessible and some of the information private. The private information may include information for verifying the user's ownership of the particular NFT, and the public information may include information that the user wishes to publicly share with others that access the link associated with the embedded tag of the good. For instance, the private information may include the name and address of the user, and the public information may include a picture of the user and/or links to the user's social media pages without exposing the user's name and address.

Process 300 may include recording (at 314) the particular NFT to the blockchain. In some embodiments, recording (at 314) the particular NFT may include hashing the file or digital asset that stores the particular NFT artifact, obtaining ownership information of the user from the user profile, and entering the particular NFT (e.g., the hash result) with the ownership information to the blockchain. In some embodiments, the ownership information may include specific identifying information such as the name, street address, telephone number, and/or email address of the user. In some embodiments, the ownership information may include indirect identifying information such as a URL for one or more web site managed by the user.

Process 300 may include linking (at 316) the particular NFT to the selected good. Linking (at 316) the particular NFT may include linking the URL that is encoded in the embedded tag of the selected good to the public information from the user profile. The URL encoded within the tag and the tag itself are not modified. Instead, NFT-linked-goods system 200 may generate one or more scripts, links, codes for dynamically populating the website that is accessed using the URL with the public information from the user profile and/or with the latest ownership information stored for the particular NFT on the blockchain. In some embodiments, the public profile may include a link for extracting the latest ownership information or ownership history from the particular NFT on the blockchain. In the event that the particular NFT is sold and/or the particular NFT ownership information changes on the blockchain, the website that is accessed using the unique URL encoded to the embedded tag of the selected good will automatically update to reflect the latest ownership information recorded on the blockchain as a result of not being hardcoded with the ownership information, but rather dynamically pulling the ownership information from the blockchain each time the unique URL or website is requested.

The link (at 316) created between the particular NFT and the selected good may bestow benefits beyond independent ownership of the selected good and the particular NFT, and/or may provide a combined value that is greater than the separate value of each of the selected good and the particular NFT. In some embodiments, possession of the selected good and ownership of the particular NFT that is associated with the selected good may be used to verify and/or authenticate a user for events, locations, and/or other secured physical or digital experiences. For instance, a ticket to an event may be based on the combination of a user wearing apparel that presents a particular NFT artifact and the apparel being embedded with a tag that evidences the user's ownership of the NFT for the particular NFT artifact. Possession of the apparel without being the verified owner of the associated NFT, or demonstrating ownership of the NFT without possession of the apparel presenting the artifact associated with that NFT may be insufficient to satisfy a two-prong verification and/or authentication that is required for access.

Figure 4:
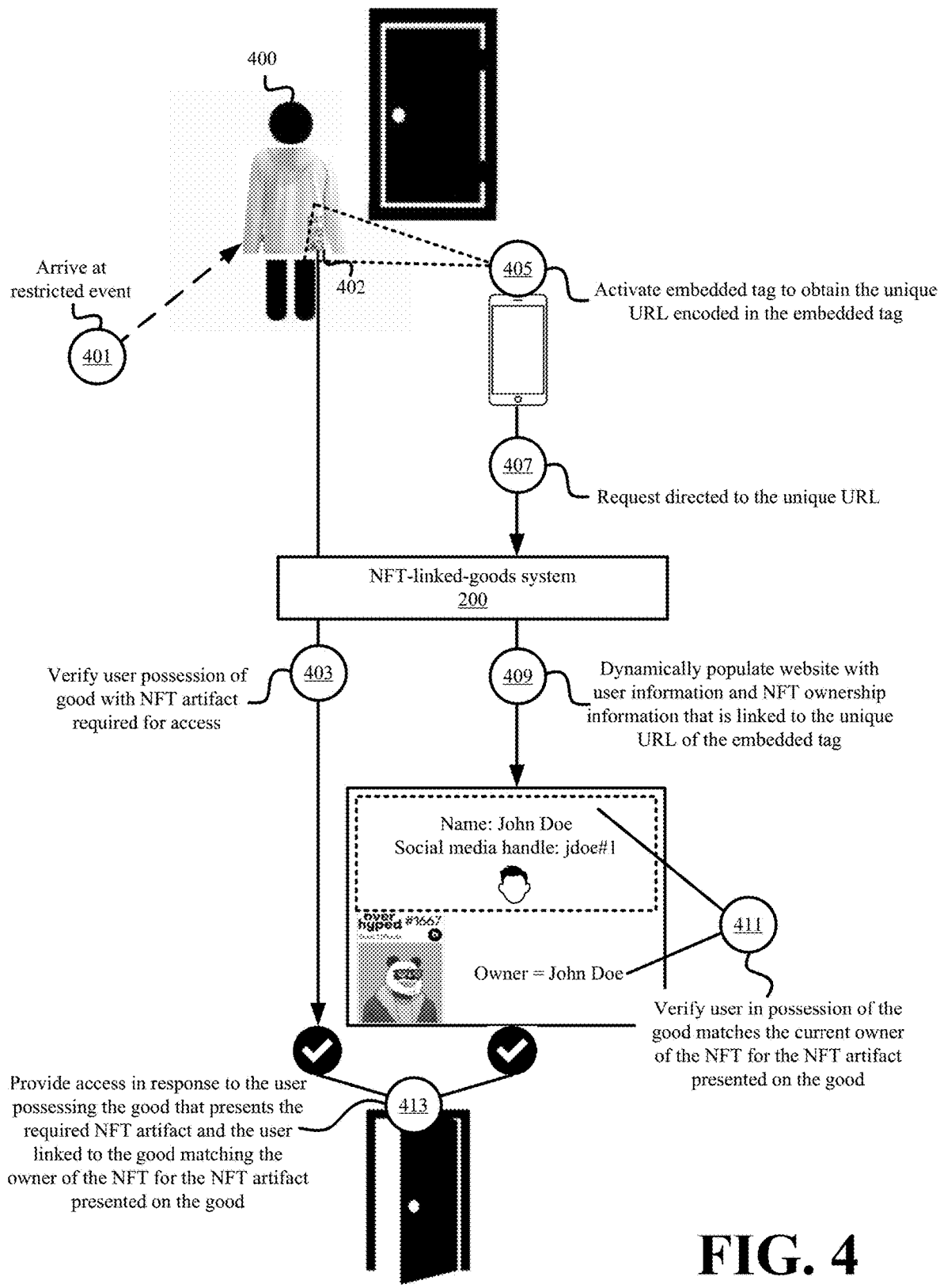
FIG. 4 illustrates an example of performing a two-prong verification to provide access based on apparel that is embedded with a machine-readable tag in accordance with some embodiments presented herein.

FIG. 4 illustrates an example of performing a two-prong verification to provide access based on apparel that is embedded with a machine-readable tag in accordance with some embodiments presented herein. As shown in FIG. 4, user 400 may arrive (at 401) at an exclusive event. The event may restrict access to owners of NFTs from a particular NFT collection who also possess the apparel linked to the owner's NFT.

NFT-linked-goods system 200 may verify (at 403) that user 400 satisfies the first prong of the two-prong verification based on user 400 demonstrating possession of the physical good that presents NFT artifact 402, and NFT artifact 402 being one of the NFT artifacts from the particular NFT collection that is required for access. In some embodiments, the first prong of the two-prong verification may be satisfied by uploading a picture taken of the good with NFT artifact 402 at the event to NFT-linked-goods system 200, and NFT-linked-goods system 200 verifying (at 403) that NFT artifact 402 is within the particular NFT collection.

An NFC reader may be placed over the embedded tag that is adjacent or underneath NFT artifact 402, and may activate (at 405) the embedded tag to obtain the unique URL encoded in the tag. The NFC reader may issue (at 407) a request for the unique URL. The request may route to NFT-linked-goods system 200, and NFT-linked-goods system 200 may dynamically populate (at 409) the website that is accessed using the unique URL with information from the public profile of the user that is linked to the unique URL and with the most recent ownership information stored on the blockchain for the NFT of NFT artifact 402.

The second prong of the two-prong verification may be evaluated based on the information that NFT-linked-goods system 200 populates within the website accessed at the unique URL. As shown in FIG. 4, user 400 satisfies (at 411) the second prong as a result of user 400 being identified in the dynamically populated web site and on the blockchain as the current owner of the NFT for NFT artifact 402. In other words, user 400 may satisfy the second prong when the user identifying information from the user profile that is linked to the unique URL matches the current owner information stored in the blockchain for the NFT that is also linked to the unique URL. In some embodiments, security personnel may perform the verification based on the information provided by NFT-linked-goods system 200 in response to the request directed to the unique URL encoded within the embedded tag of the good worn by user 400. In response to satisfying both prongs of the two-prong verification, NFT-linked-goods system 200 or the security personnel may grant, unlock, open, and/or otherwise provide (at 413) user 400 with access to the event. In some embodiments, NFT-linked-goods system 200 may provide a notification to the security personnel to provide the user with access.

User 400 may be denied access when the user identifying information from the user profile that is linked to the specific URL encoded in the embedded tag of the possessed good does not match to the identifying information for the owner of the NFT that is linked to the same specific URL encoded in the embedded tag of the possessed good. Similarly, if user 400 demonstrates ownership of the NFT created for NFT artifact 402, but does possess the apparel presenting NFT artifact 402 with the embedded tag linking to the ownership information, then user 400 may be denied entry. In each case, the user may fail one or more of the two-prong requirement for access.

FIG. 4 illustrates how possession of a good that is linked to a particular NFT combined with verified ownership of the particular NFT via the tag embedded with the good may convey additional value to the user beyond the separate values associated with possessing the good and owning the particular NFT. Nevertheless, a good that is linked to a particular NFT may be disassociated or separated from the particular NFT as a result of the user selling the good without transferring ownership of the particular NFT, or the user selling and/or transferring ownership of the particular NFT to another while retaining possession of the good.

Figure 5:
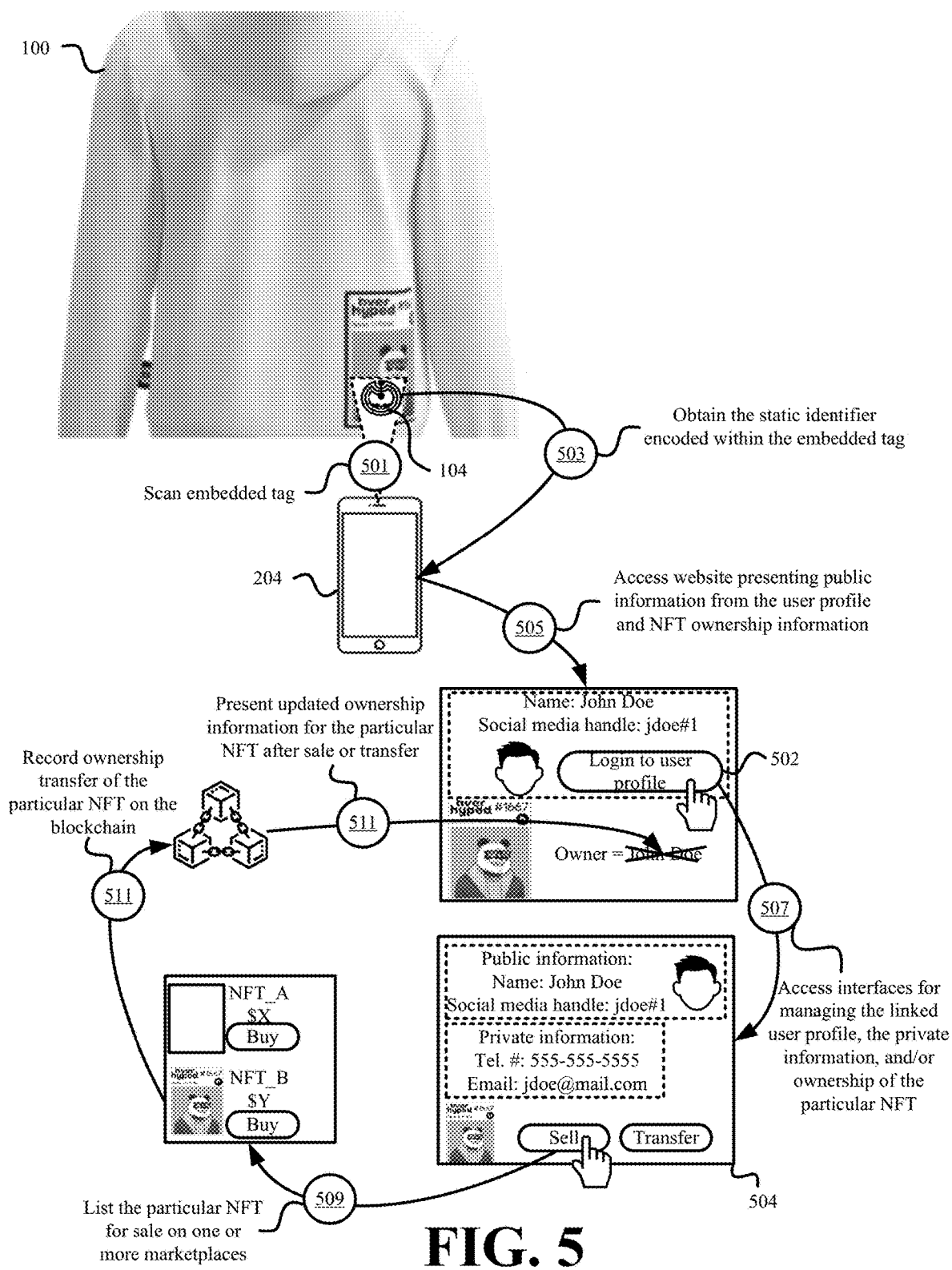
FIG. 5 illustrates an example of disassociating a particular NFT from a good that is linked to that particular NFT in accordance with some embodiments presented herein.

FIG. 5 illustrates an example of disassociating a particular NFT from a good that is linked to that particular NFT using one or more user interfaces ("UIs") in accordance with some embodiments presented herein. As shown in FIG. 5, a user may use device 202 to scan (at 501) embedded tag 104 of good 100 in the user's possession, and may obtain (at 503) the static identifier that is encoded within embedded tag 104.

Device 202 may open or access (at 505) the website containing the public information from the user profile that is linked to that static identifier, and the latest ownership information for the particular NFT that is linked to that static identifier from the blockchain. The website may include link and/or selectable interactive element 502 with which the user may login to the user profile that is linked to that static identifier. Upon selecting interactive element 502 and providing the correct access credentials for the user profile that is linked to the static identifier encoded within embedded tag 104, NFT-linked-goods system 200 may generate and/or provide (at 507) the user with access to one or more UIs 504 for managing the linked user profile, the private information therein, and/or ownership of the particular NFT.

In some embodiments, the user may manually direct a browser or other application to the login page, and enter a username and password into the login page. Once authenticated, the browser or application may be directed to UIs 504 from which ownership of all NFTs owned by that user may be managed.

UIs 504 may include links and/or interactive selectable elements for listing (at 509) the particular NFT and/or other NFTs that are linked to the user profile and owned by the user on one or more NFT marketplaces. In some embodiments, the user may specify the price at which to sell the particular NFT, or may initiate an auction for a particular period of time during which potential buyers may outbid one another to buy the particular NFT.

In response to the sale of the particular NFT, funds from the sale may be deposited in the user's account, and updated ownership of the particular NFT may be recorded (at 511) on the blockchain. The blockchain may be a ledger that records the creation and every sale or transfer of the particular NFT and other NFTs. Consequently, the particular NFT will be disassociated from the good after the sale or transfer. Specifically, embedded tag 104 may continue to link to the same static identifier, and the website that is accessible at that static identifier may continue to present the ownership information for the particular NFT whenever the website is requested. However, the website dynamically pulls (at 513) the ownership information for the particular NFT from the blockchain in response to each request such that the user identified from the user profile that is linked to the static identifier is no longer identified as the owner of the particular NFT.

In some embodiments, a user may use UIs 504 to transfer the NFT association from a first good to a second good. For instance, the first good may correspond to a first sweatshirt that displays the artwork associated with the particular NFT. The first good may become stained, damaged, or otherwise ruined. The user may order the second good to be a duplicate of the first good without having to repurchase ownership of the particular NFT. In other words, the user may order the same sweatshirt with the same artwork but with a different embedded tag.

The NFT association may be transferred with the user accessing the embedded tag of the first good, entering the login information to access the private information associated with the user profile, selecting an interactive element to associate ownership of the particular NFT to a new good, and scanning the embedded tag of the second good to associate the particular NFT to the second good. In this manner, ownership of a particular NFT may be associated with two or more goods bearing the same artwork under possession of the same user. For instance, the user may purchase a shirt, pants, and a hat that present the same NFT owned by the user. The user may associate the embedded tag within each of the shirt, pants, and hat to the NFT using the UIs when the unique URLs from the embedded tags of each of the goods is associated with and/or access the same user profile.

In some embodiments, NFT-linked-goods system 200 may recognize when an NFT is being associated with the profile of a different user that does not currently own the NFT. In some such embodiments, NFT-linked-goods system 200 may transfer ownership of the NFT from the original user to the new user via a recorded ownership change on the blockchain.

In some embodiments, goods may be sold and/or transferred with or without the linked NFTs being sold and/or transferred. In some such embodiments, an original owner of the good may sell the good to a buyer, and the original owner may use UIs 504 to remove the link between the original owner's user profile and the static identifier encoded in the embedded tag of the good, and to create a link between the buyer's user profile and the static identifier. Thereafter, each time the embedded tag of the transferred good is read, the same static identifier is extracted. However, the website that is accessed using the static identifier will be dynamically populated with the public information from the buyer's user profile.

In some embodiments, the embedded tags may also be used to authenticate that the associated good is an original or comes from a specific manufacturer, seller, or brand, and is not a counterfeit, unauthorized replica, or knockoff. In some such embodiments, the embedded tags may provide differing degrees of authentication.

Figure 6:
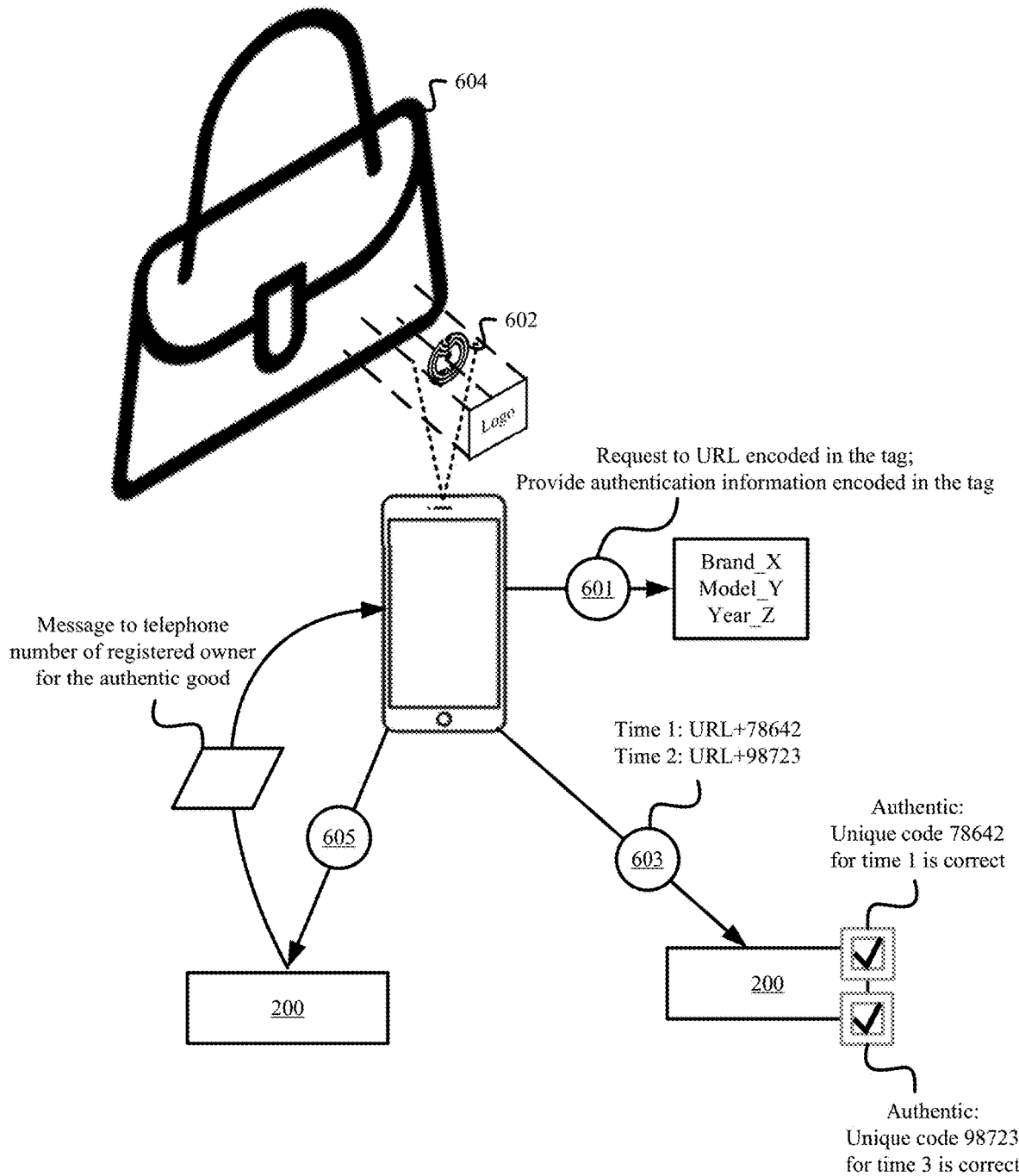
FIG. 6 illustrates an example of using the embedded tag to provide different forms of good authentication in accordance with some embodiments presented herein.

FIG. 6 illustrates an example of using the embedded tag to provide different forms of good authentication in accordance with some embodiments presented herein. As before, machine-readable NFC, RFID, or other tag 602 may be embedded at a particular location of good 604.

A first form of good authentication 601 may be provided by encoding embedded tag 602 with identifying information about good 604 including, for example, the make and model of good 604, the name of the manufacturer, the name of the authorized seller, etc. Alternatively, tag 602 may be encoded with a URL to a website where the identifying information may be accessed. This first form of good authentication 601 may verify the authenticity of the good based on the presence or absence of embedded tag 602 and/or correct information linked to tag 602. For instance, a counterfeit good may have the same shape, look, pattern, design, and/or ornamental form as an authentic good, but may lack the embedded tag for verifying the authenticity of the good.

A second form of good authentication 603 may be provided by encoding embedded tag 602 with a URL and an encrypted message generator that generates a unique message or value each time tag 602 is read. The unique message may be passed along with a request to access the URL. The website may verify the unique message, and may verify the authenticity of good 604 based on a successful verification of the unique message or unsuccessful verification of the unique message. In some embodiments, tag 602 may be encoded with the encrypted message generator and not the URL. In some such embodiments, an application on the user device being used to scan embedded tag 602 may verify the unique message that is read from embedded tag 602.

The second form of good authentication 603 may be implemented using a cryptographically secure tag. The cryptographically secure tag may contain a secret symmetric key that is stored in a secured memory space of tag 602. Each time tag 602 is scanned, tag 602 may increase its counter by one, and may generate a cryptographically secure signature by encrypting a unique identifier or electronic product code and counter together. Tag 602 may further add a signature, and may return the generated values as query string parameters of an encoded URL.

A third form of good authentication 605 may be provided by encoding embedded tag 602 with a unique URL, and registering information about the buyer to the unique URL. For instance, at the time of purchase, embedded tag 602 may be read by a secure system of an authorized retailer that has permission to update information presented on the website associated with the unique URL. The buyer may provide a telephone number, picture, name, or other identifying information to associate with the site. A counterfeit good may be embedded with a tag that points to the same unique URL, but the creator of the counterfeit good will be unable to change the information presented on the site. Accordingly, when embedded tag 602 is scanned, a request may be issued to the unique URL and the buyer's identifying information may be presented to authenticate good 604 based on the owner of the good matching to the buyer's identifying information. In some embodiments, a form of two-factor authentication may be performed by sending a message to the telephone number that was registered to the authenticated good so that the owner may prove the good to be authentic upon receiving the message after having scanned the embedded tag.

Figure 7:
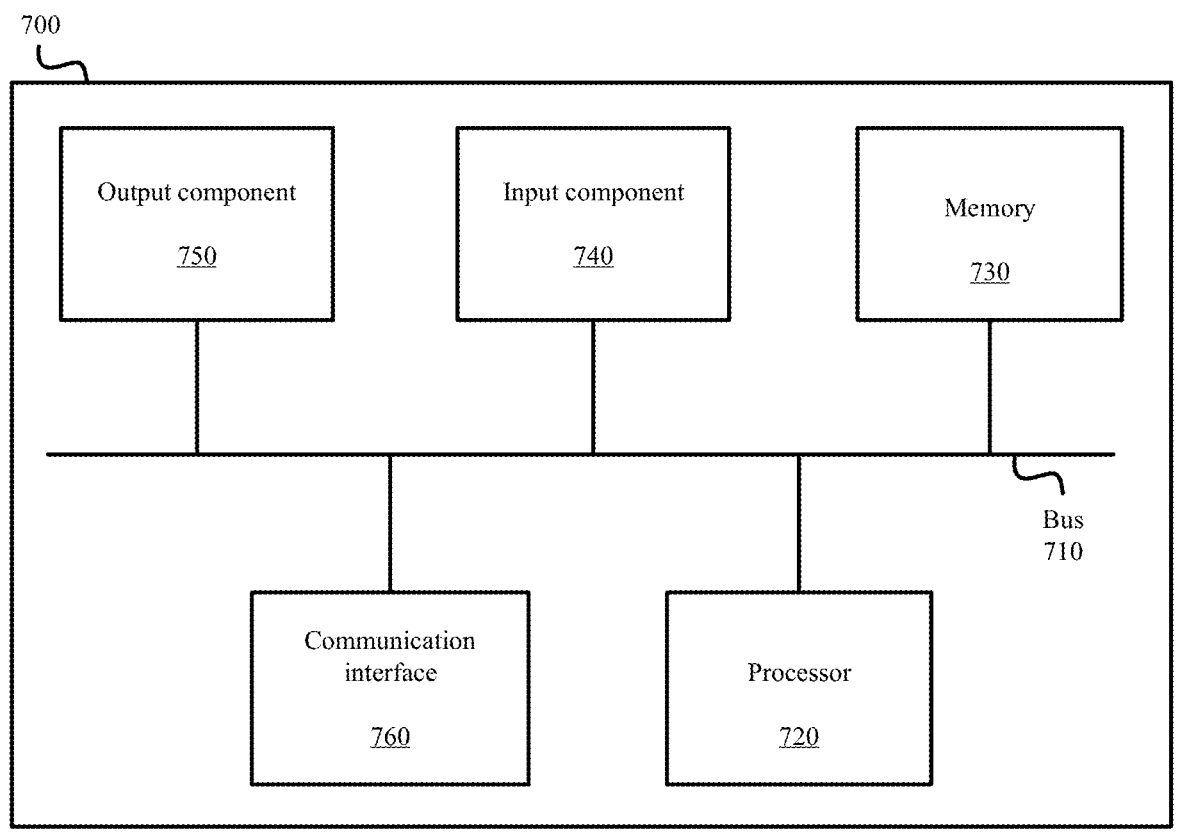
FIG. 7 illustrates example components of one or more devices, according to one or more embodiments described herein.

FIG. 7 is a diagram of example components of device 700. Device 700 may be used to implement one or more of the devices or systems described above (e.g., NFT-linked-goods system 200, device 202, and encoding, manufacturing, printing, NFT minting, and/or other devices or equipment controlled by NFT-linked-goods system 200). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    identifying, at a system comprising one or more computer processors, a good comprising a visualization of a non-fungible token ("NFT") artifact, and a tag that is encoded with a unique network identifier;
    obtaining, by operation of the one or more computer processors, data for a profile of a user that purchases the good;
    linking, by operation of the one or more computer processors, the data from the profile of the user to the unique network identifier;

recording, by operation of the one or more computer processors, the user as an owner of a NFT created for the NFT artifact on a blockchain;

linking, by operation of the one or more computer processors, the NFT to the unique network identifier; and presenting, by operation of the one or more computer processors, a website comprising (i) the data from the profile and (ii) ownership information recorded with the NFT on the blockchain in response to a request from a device that reads the unique network identifier from the tag.

2. The method of claim 1 further comprising:

embedding the tag under the visualization of the NFT artifact, wherein the tag comprises one of a Near Field Communication ("NFC") tag, Radio-Frequency Identification ("RFID") tag, or integrated circuit.

3. The method of claim 1, wherein the NFT artifact comprises an image that is affixed to an outer layer of the good, and wherein the good comprises apparel or a clothing accessory.

4. The method of claim 1 further comprising:

receiving, by operation of the one or more computer processors, the request that is directed to the unique network identifier from the device;

determining, by operation of the one or more computer processors, that the profile of the user and the NFT are linked to the unique network identifier;

populating, by operation of the one or more computer processors, the website based on a first set of data from the profile;

querying, by operation of the one or more computer processors, the blockchain for a most recent entry of the NFT on the blockchain; and populating, by operation of the one or more computer processors, the website based on the ownership information recorded with the most recent entry of the NFT.

5. The method of claim 1 further comprising:

generating, by operation of the one or more computer processors, the NFT for the NFT artifact based on a hash of a digital representation of the NFT artifact; and creating a physical representation of the NFT artifact on the good.

6. The method of claim 1 further comprising:

verifying that a particular user possesses the good;

verifying, by accessing the system, that the particular user is identified as the owner of the NFT; and providing access in response to successfully verifying that the particular user possesses the good and that the particular user is identified as the owner of the NFT via the system.

7. The method of claim 6, wherein verifying that the particular user is identified as the owner of the NFT comprises:

determining, by operation of the one or more computer processors, that the data from the profile identifying the user on the website matches the ownership information recorded with the NFT and presented on the website.

8. The method of claim 7, wherein verifying that the particular user possesses the good comprises:

comparing the data from the profile identifying the user, provided by the system, to identifying information provided by the user in possession of the good.

9. The method of claim 1, wherein the user is a first user, and the method further comprises:

transferring, by operation of the one or more computer processors, ownership of the NFT from the first user to a second user; and updating, by operation of the one or more computer processors, the website that is presented in response to a subsequent request directed to the unique network identifier, wherein updating the website comprises presenting the data from the profile of the first user on the website and changing the ownership information for the NFT presented on the website in response to transferring the ownership of the NFT from the first user to the second user.

10. A system comprising:

one or more processors configured to:

identify a good comprising a visualization of a non-fungible token ("NFT") artifact, and a tag that is encoded with a unique network identifier;

obtain data for a profile of a user that purchases the good;

link the data from the profile of the user to the unique network identifier;

record the user as an owner of a NFT created for the NFT artifact on a blockchain;

link the NFT to the unique network identifier; and present a website comprising (i) the data from the profile and (ii) ownership information recorded with the NFT on the blockchain in response to a request from a device that reads the unique network identifier from the tag.

11. The system of claim 10, wherein the system comprises a manufacturing node that is adapted to:

embed the tag under the visualization of the NFT artifact, wherein the tag comprises one of a Near Field Communication ("NFC") tag, Radio-Frequency Identification ("RFID") tag, or integrated circuit.

12. The system of claim 10, wherein the NFT artifact comprises an image that is affixed to an outer layer of the good, and wherein the good comprises apparel or a clothing accessory.

13. The system of claim 10, wherein the one or more processors are further configured to:

receive the request that is directed to the unique network identifier from the device;

determine that the profile of the user and the NFT are linked to the unique network identifier;

populate the website based on a first set of data from the profile;

query the blockchain for a most recent entry of the NFT on the blockchain; and populate the website based on the ownership information recorded with the most recent entry of the NFT.

14. The system of claim 10, wherein the one or more processors are further configured to:

generate the NFT for the NFT artifact based on a hash of a digital representation of the NFT artifact; and create a physical representation of the NFT artifact on the good.

15. The system of claim 10, wherein the one or more processors are further configured to:

verify that a particular user possesses the good;

verify that the particular user is identified as the owner of the NFT; and provide access in response to successfully verifying that the particular user possesses the good and that the particular user is identified as the owner of the NFT.

16. The system of claim 15, wherein verifying that the particular user is identified as the owner of the NFT comprises:
   determining that the data from the profile identifying the user on the website matches the ownership information recorded with the NFT and presented on the website.

17. The system of claim 16, wherein verifying that the particular user possesses the good comprises:
   comparing the data from the profile identifying the user to identifying information provided by the user in possession of the good.

18. The system of claim 10, wherein the user is a first user, and the one or more processors are further configured to:
   transfer ownership of the NFT from the first user to a second user; and
   update the website that is presented in response to a subsequent request directed to the unique network identifier, wherein updating the website comprises presenting the data from the profile of the first user on the website and changing the ownership information for the NFT presented on the website in response to transferring the ownership of the NFT from the first user to the second user.

19. A non-transitory computer-readable medium, storing a plurality of processor-executable instructions to:
   identify a good comprising a visualization of a non-fungible token ("NFT") artifact, and a tag that is encoded with a unique network identifier;
   obtain data for a profile of a user that purchases the good;
   link the data from the profile of the user to the unique network identifier;
   record the user as an owner of a NFT created for the NFT artifact on a blockchain;
   link the NFT to the unique network identifier; and
   present a website comprising (i) the data from the profile and (ii) ownership information recorded with the NFT on the blockchain in response to a request from a device that reads the unique network identifier from the tag.

* * * * *